Oct. 14, 1941.   F. J. YOUNG   2,259,362
LAMINATING AND STRETCHING
Filed March 14, 1940
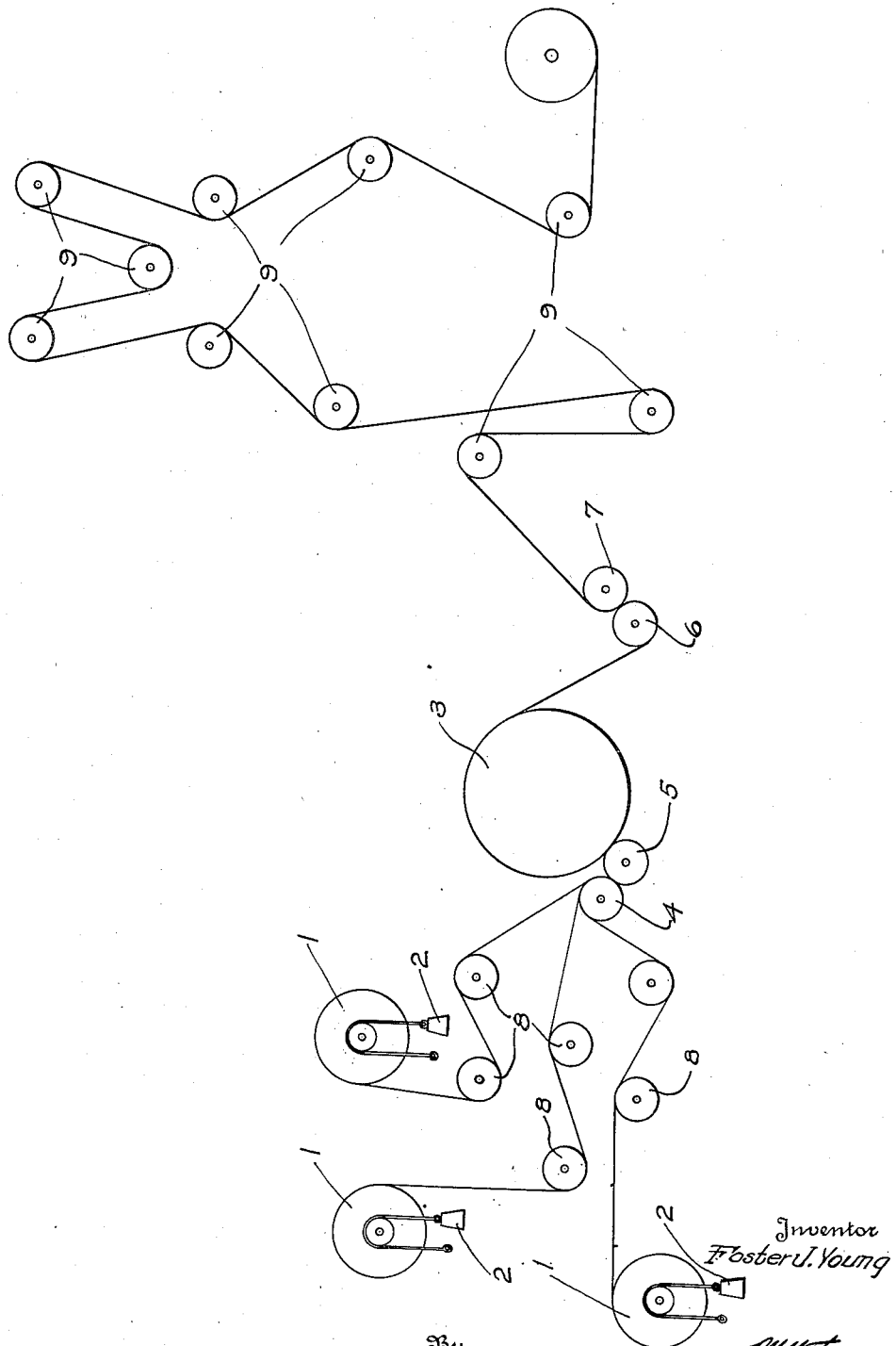
Inventor
Foster J. Young

UNITED STATES PATENT OFFICE 2,259,362

LAMINATING AND STRETCHING

Foster J. Young, Kent, Ohio, assignor to Wingfoot Corporation, Wilmington, Del., a corporation of Delaware Application March 14, 1940, Serial No. 323,858

1 Claim. (Cl. 18—59)

This invention relates to the process of laminating and stretching rubber hydrochloride film or other heat-sealable and thermo-stretchable, flexible film. By "thermo-stretchable" is meant the ability to be stretched when heated.

According to this invention the film is heated and laminated and then stretched as a part of one continuous operation. To prevent or reduce to a minimum the amount of air entrapped between the plies these are brought together in a flat condition, free from wrinkles, before they are heated. They are then passed between pressure rolls which squeeze out any air which may be present between the plies. Then, while keeping pressure on the plies to prevent the re-entrance of air between them, they are passed over a heated roll where they are heated to the fusion point and pressed together with sufficient pressure to cause them to coalesce. Then, as the laminated sheet thus formed is withdrawn from the heated roll, it is stretched to at least double its length to increase its tensile strength.

The film used for lamination may be any width from several inches up to several feet or more. It may be of any thickness, but preferably is around 0.001 to 0.0015 inch thick. The film may be plasticized or unplasticized. It may be colored or uncolored. It may contain light stabilizers, etc. Films of different colors may be united to produce attractive color effects.

The film may be stretched to 3 or 4 or 6 or more times its original length. This stretching imparts increased tensile strength to the film and gives it other properties not found in the unstretched film. By laminating several plies of the stretched film a sheet may be built up which may be no thicker than the original sheet but which has greater tensile strength and is improved with respect to tear-resistance in the direction across the grain of the film, etc. The laminated sheet may be thinner or thicker than the original sheet. It may comprise as few as two plies of the stretched film or it may comprise four or six plies up to as many as ten or more. The various plies may be all of the same color and quality, or rubber hydrochloride films having different physical or chemical properties may be united to give the final sheet certain desired characteristics.

In carrying out the process of this invention, the several plies of unstretched film are brought together with their surfaces in contact throughout their width and this operation is completed before any of the plies are heated. The plies thus brought together will preferably pass through the pinch rolls which control the speed at which the various plies of film are fed to the roll where the plies are heated. From the time that these plies enter the bight of the pinch rolls, they are maintained with their surfaces in contact throughout their width until they are brought on to the heated roll where they are heated to such a temperature that the overlying plies coalesce. The object is to eliminate all air from between the plies before they are heated so that during and after heating there will be no air bubbles between the plies. According to the preferred method of operation the several plies are separately fed onto one of the pinch rolls and each of the plies is spread out flat as it reaches this roll. The usual means for removing wrinkles may be used. The attendant should see that each ply is free from wrinkles. The plies then pass through the bight between the two pinch rolls, pass part way around one of the pinch rolls and contact the heated roll before they leave this pinch roll. In this way, the plies are maintained in contact with one another with only the minimum opportunity for air to be entrapped between the plies. They are kept in this condition until they are softened by heat from the heated roll which causes the plies to coalesce. The laminated sheet thus formed is then stretched by being withdrawn from the heated roll at a greater speed than it is fed to the rolls. It is then cooled while still under tension.

The invention will be further described in connection with the accompanying drawing in which the invention is shown in a more or less diagrammatic manner.

The drawing shows the union of three plies of rubber hydrochloride film. These plies are separately fed from the let-off rolls 1. Weights 2 are provided to keep the plies taut as they leave the rolls 1.

The roll 3 is of relatively large diameter, for example, 8 or 10 inches or more, and is heated by steam or other means to a sufficient temperature to cause coalescence of the plies as they pass over the roll. The diameter is so chosen that the time of contact between the plies and the roll is sufficient to cause the plies to be heated and coalesce as they pass over the surface of the roll. The surface speed of the pinch rolls 4 and 5 determines the rate at which the several plies are fed to the hot roll 3. Similarly, the surface speed of the rolls 6 and 7 determines the rate at which the laminated sheet is drawn off the hot roll 3. The surface speed of the rolls 6 and 7 may, for example, be 4 or 5 times, more or less, the surface speed of the rolls 4 and 5.

The drawing shows means for uniting three plies of cast rubber hydrochloride film. This film may be prepared as described in Calvert U. S. Patent No. 1,989,632. The three plies are separately drawn off the rolls 1 and after passing over idler rolls they are brought in contact as they contact the pinch roll 4. As shown in the drawing the different plies come on to the roll 4 at different positions. These plies leave the rolls 1 in a perfectly flat condition and the idler rolls 8 keep these plies flat and they are flat when they come on to the pinch roll 4. Of course, it is the duty of the operator to see that this is the case. It is obvious from the drawing that as the plies pass between the pinch rolls 4 and 5 little or any air will remain between them. The plies are in close contact with the roll 5 as they pass from the roll 4 to the roll 3. The roll 5 drives the hot roll 3.

The rolls 4 and 5 are preferably rubber-covered rolls as are also the rolls 6 and 7. The rolls 9 are provided to serve as a cooling festoon for the film. It is important to have the rolls 6 and 7 at such a distance from the roll 3 that most of the heat is dissipated from the film before it reaches the rolls 6 and 7 so that the stretched film is cooled while still in the stretched condition. Means should be provided in the festoon or thereafter to permit shrinking which may result from further cooling or aging of the stretched laminated sheet.

I claim:

In the process of stretching and laminating a plurality of plies of rubber hydrochloride film by passing them over a hot roll, where they are heated and coalesce, at a slower speed than the speed at which they are drawn off the roll and in which the rate at which the plies are fed to the hot roll is controlled by passing the plies between the bight of a first and second pinch roll with the second pinch roll separated from the hot roll only by film fed from the second pinch roll to the hot roll and with the surface speed of the pinch rolls and the hot roll the same, the improvement which comprises bringing the several plies in a flat condition to the first pinch roll but at different places on the circumference of the first pinch roll and passing the plies together between the bight of the pinch rolls and maintaining them in surface contact with the second pinch roll from the bight between the pinch rolls to the surface of the hot roll.

FOSTER J. YOUNG.